(12) United States Patent  (10) Patent No.: US 8,605,907 B2
Messerges et al.  (45) Date of Patent: Dec. 10, 2013

(54) METHOD AND APPARATUS FOR EXTENDING A KEY-MANAGEMENT PROTOCOL

(75) Inventors: Thomas S. Messerges, Schaumburg, IL (US); Adam C. Lewis, Buffalo Grove, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 368 days.

(21) Appl. No.: 12/961,992

(22) Filed: Dec. 7, 2010

(65) Prior Publication Data

US 2012/0140928 A1  Jun. 7, 2012

(51) Int. Cl.
*H04L 29/06* (2006.01)
(52) U.S. Cl.
USPC .......................................................... 380/277
(58) Field of Classification Search
USPC .......................................................... 380/277
See application file for complete search history.

(56) References Cited

U.S. PATENT DOCUMENTS

| 2009/0092254 | A1* | 4/2009 | Lee et al. | 380/278 |
| 2009/0316911 | A1* | 12/2009 | Cho et al. | 380/284 |
| 2012/0057697 | A1* | 3/2012 | Holtmanns et al. | 380/42 |

OTHER PUBLICATIONS

Carrara et al. "The Key ID Information Type for the General Extension Payload in Multimedia Internet KEYing (MIKEY)" Jun. 2006, pp. 1-10 from http://tools.ietf.org/html/rfc4563.*

J. Arkko, et al.; RFC 4567; Key Management Extensions for Session Description Protocol (SDP) and Real Time Streaming Protocol (RTSP); Royal Institute of Technology, Jul. 2006; 31 Pages.
J Arkko, et al.; RFC 3830; "MIKEY; Multimedia Internet Keying", Ericsson Research, Aug. 2004; 67 Pages.
M. Baugher, et al.; RFC 3547; "The Group Domain of Interpretation", Jul. 2003; 49 Pages.
H. Harney, et al.; RFC 4535; GSAKMP: Group Secure Association Key Management Protocol; Jun. 2006; 107 Pages.
TIA/EIA Standard, ANSI/TIA/EIA-102.AACA-2001; Project 25; Digital Radio Over-The-Air Rekeying (OTAR) Protocol; Telecommunications Industry Association; Apr. 12, 2001; 180 Pages.
Tetra Mou; Security and Fraud Prevention Group; Recommendation 02, Edition 4; End-To-End Encryption; Jan. 27, 2005; 141 Pages.
Terrestrial Trunked Radio (TETRA); Voice Plus Data (V+D); Part 7:Security; Final Draft ETSI EN 300 392-7 V3.2.0; Feb. 2010; 209 Pages.
Hao Yin, et al; "A Novel Key Management and Distribution Solution for Secure Video Multicast"; Dept. of Computer Science, Tsinghua University, Beijing, China; PCM 2005, Part II, LNCS 3768; pp. 246-257.
PCT Search Report Dated Mar. 14, 2012 for Counterpart Application PCT/US2011/063071.

(Continued)

*Primary Examiner* — Lisa Lewis
(74) *Attorney, Agent, or Firm* — Valerie M. Davis; Kenneth A. Haas

(57) ABSTRACT

A method and apparatus for modifying the Multimedia Internet KEYing (MIKEY) protocol to support an extended key-management message (KMM), wherein the apparatus programs a computer to perform the method, which includes: determining that a KMM is directed to a target device; determining that the KMM is an extended KMM related to a key-management operation that is not supported by the standard MIKEY protocol; signaling the extended KMM in at least one field of a MIKEY message; and sending the MIKEY message to the target device.

2 Claims, 16 Drawing Sheets

(56) References Cited

OTHER PUBLICATIONS

Open Mobile Alliance: "Service and Content Protection for Mobile Broadcast Services (Candidate Version 1.0)", Open Mobile Alliance, Aug. 7, 2008, XP040481117, Section 6.6 Layer 2; Service Provisioning and LTKM Delivery Section 6.7 Layer 3: Short Term Key Message—STKM.

* cited by examiner

| KMM TYPE | KMM DESCRIPTION |
| --- | --- |
| 0x00 | RESERVED |
| 0x01 | DELETE KEY |
| 0x02 | ACTIVATE KEY |
| 0x03 | UE STATUS |
| 0x04 | HELLO GCKS |
| 0x05 | UPDATE KEY |
| 0x06 | PULL KEY |
| 0x07 | ASSOCIATE KEY WITH GROUP |
| 0x08 | GCKS STATUS |
| 0x09 | GCKS PROVISION UE |
| 0x0A TO 0x10 | RESERVED |
| 0x11 | DELETE KEY RESPONSE |
| 0x12 | ACTIVATE KEY RESPONSE |
| 0x13 | UE STATUS RESPONSE |
| 0x14 | HELLO GCKS RESPONSE |
| 0x15 | UPDATE KEY RESPONSE |
| 0x16 | PULL KEY RESPONSE |
| 0x17 | ASSOCIATE KEY WITH GROUP RESPONSE |
| 0x18 | GCKS STATUS RESPONSE |
| 0x19 | GCKS PROVISION UE RESPONSE |
| 0x1A TO 0xFF | RESERVED |

METHOD AND APPARATUS FOR EXTENDING A KEY-MANAGEMENT PROTOCOL

TECHNICAL FIELD

The present disclosure relates generally to key-management protocols, and in particular to a method and apparatus for modifying the Multimedia Internet KEYing (MIKEY) protocol to support extended key-management operations.

BACKGROUND

A key-management protocol relates to creation, distribution, and maintenance of a security key (also interchangeably referred to as a key) in a communication system. One key-management protocol is often incompatible with another key-management protocol. In addition, two key-management protocols usually provide different sets of key-management operations and functionality. Oftentimes, a communication system comprises different types of communication devices that support different key-management protocols. In such cases, the communication system needs to support key-management operations provided by more than one key-management protocol. For example, a communication system may support both broadband and narrowband devices, where the MIKEY protocol running on the broadband devices does not provide certain key-management operations provided by a second key-management protocol running on the narrowband devices. In this scenario, it becomes challenging to perform, on the broadband devices, some key-management operations that are supported only by the second key-management protocol running on the narrowband devices.

Accordingly, there is a need for a method and apparatus that extends the MIKEY protocol to support some key-management operations that are available only in the second key-management protocol.

BRIEF DESCRIPTION OF THE FIGURES

The accompanying figures, where like reference numerals refer to identical or functionally similar elements throughout the separate views, together with the detailed description below, are incorporated in and form part of the specification and serve to further illustrate various embodiments of concepts that include the claimed invention, and to explain various principles and advantages of those embodiments.

FIG. 15 illustrates a list of key-management functions not supported by the MIKEY protocol in accordance with some embodiments.

Figure 1:
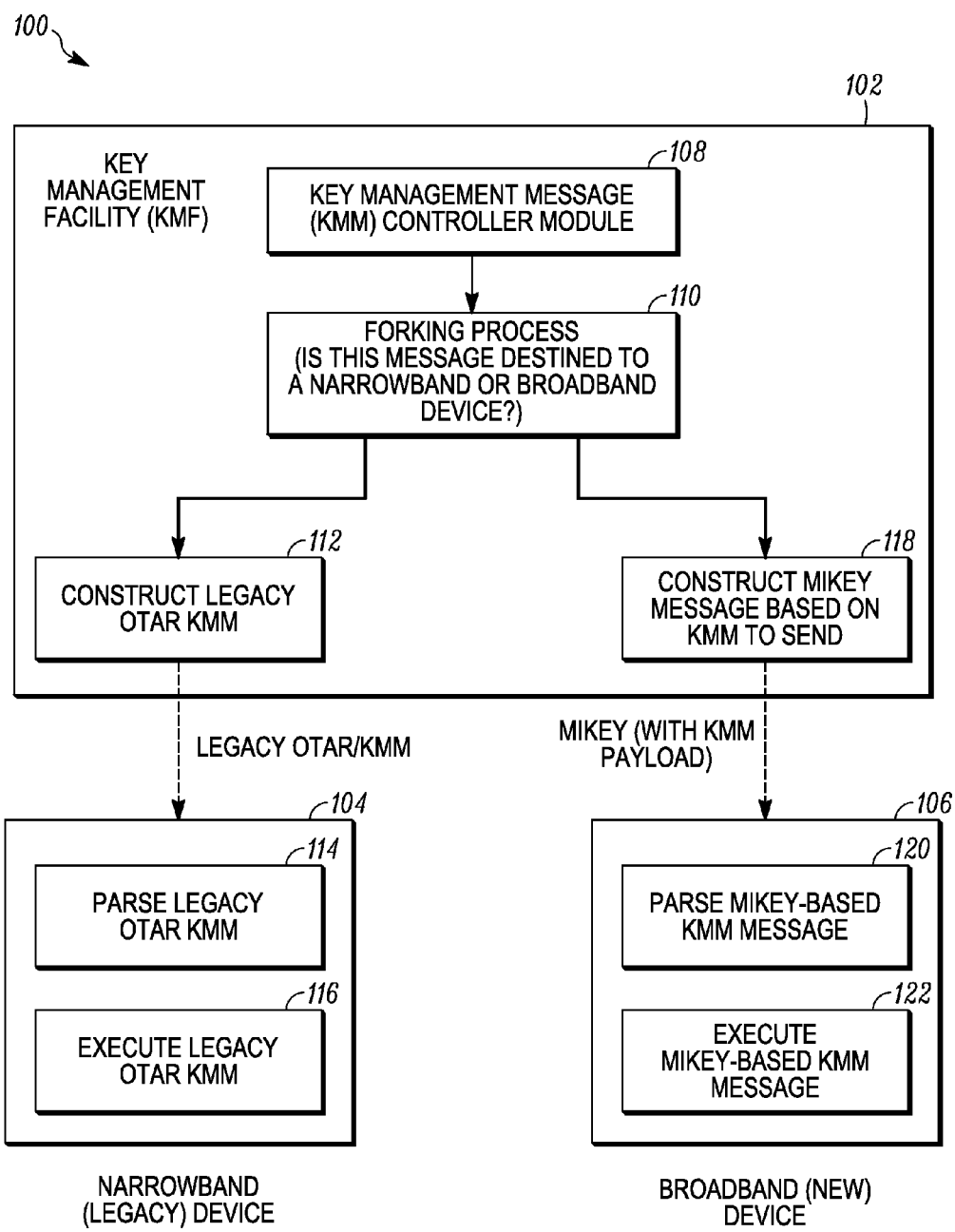
FIG. 1 illustrates a system implementing embodiments of the present teachings.

Skilled artisans will appreciate that elements in the figures are illustrated for simplicity and clarity and have not necessarily been drawn to scale. For example, the dimensions of some of the elements in the figures may be exaggerated relative other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides a method and apparatus for extending the MIKEY protocol (also interchangeably referred to as the standard MIKEY protocol or standard MIKEY) to support an extended Key-Management Message (KMM) related to a key-management operation that is not supported by standard MIKEY. RFC (Request for Comments) 3830 documentation, maintained by the Internet Engineering Task Force (IETF), specifies standard MIKEY. Standard MIKEY is adopted for broadband based public-safety communication systems, but lacks abilities to perform some key-management functions (also interchangeably referred to as key-management operations) that are available in some narrowband based protocols, such as the Terrestrial Trunked Radio (TETRA) protocol and the Association of Public-Safety Communications Officials International Project 25 (APCO-25) protocol.

More particularly, MIKEY supports key transport and communication of security policies for a data security protocol and further supports two key-management functions. As used herein, key transport simply means the transferring, sending or distribution of one or more keys between multiple devices and usually includes some sort of key identification mechanism. Communication of security policies for a data security protocol means the transfer, sending, or distribution of a set of policies or rules that applies to a specific security protocol used to protect or encrypt the actual data traffic (e.g., Internet Protocol Security (IPSec) and Secure Real-time Transport Protocol (SRTP) are two examples of a security protocol). A key-management function or operation means a function or operation that supports key derivation and key maintenance (such as key storage, safeguarding, and replacement), but excludes key transport and communication of security policies. As mentioned above, standard MIKEY supports two key-management functions, namely, two key derivation procedures that are described in Section 4.1.4 of RFC 3830. Other example key-management functions, which are missing from the MIKEY protocol include, but are not limited to, key deletion, key activation, key inventory inquiry, new key request, key update, key association with a group, key status update, and related responses, and are termed herein as "extended key-management functions or operations" since they are not provided for or supported by standard MIKEY.

In accordance with the present teachings, a method performed by an initiator for extending the MIKEY protocol includes constructing a message conforming to the MIKEY protocol, signaling in the MIKEY message the presence of a KMM related to a key-management function that is not supported by the MIKEY protocol, constructing the KMM in the MIKEY message, and sending the extended MIKEY message to a responder. As used herein, an extended MIKEY message is defined as a MIKEY message that is constructed to support an extended KMM related to a key-management operation that is not supported by the standard MIKEY protocol, while a standard MIKEY message is defined as a MIKEY message conforming to the MIKEY protocol without extensions. An extended KMM means a KMM that defines and specifies a key-management operation that is not supported by the MIKEY protocol, such as a key-deletion operation. An example extended KMM is a KMM that comprises a key-management protocol message constructed using a separate key-management protocol, such as TETRA or APCO-25.

In accordance with the present teachings, a method performed by the responder includes receiving, and parsing the extended MIKEY message. After the extended MIKEY message is parsed, the extended key-management function is extracted and executed. If a verification MIKEY message (also interchangeably referred to as a responder MIKEY message) is expected, the teachings herein provide for a method that includes the responder constructing and sending the verification MIKEY message to the initiator and a method that includes the initiator receiving, parsing, and processing the verification MIKEY message. As used herein, the term parsing means determining the different fields of a message and the contents of those field. A field is defined as a logical section or part of a message, i.e., a message is logically divided into a plurality of fields, wherein each field carries information related to that particular field. A sub-field is defined as a logical section or part of a field, i.e., a field (within a message) is logically divided into a plurality of sub-fields, wherein each sub-field carries information related to that particular sub-field. Those skilled in the art will realize that the above recognized advantages and other advantages described herein are merely illustrative and are not meant to be a complete rendering of all of the advantages of the various embodiments of the present disclosure.

Referring now to the drawings, and in particular FIG. 1, an illustrative communication system implementing embodiments in accordance with the present teachings is shown and indicated generally at 100. Those skilled in the art, however, will recognize and appreciate that the specifics of this illustrative example are not specifics of the invention itself and that the teachings set forth herein are applicable in a variety of alternative settings. Communication system 100 comprises a Key-Management Facility (KMF) 102 that facilitates secure key management and distribution. The KMF is included in the infrastructure of a communication system and is included, for example, in a server.

Communication system 100 further comprises a narrowband device 104 and a broadband device 106 that are commonly referred to in the art as communication devices, subscribers, user equipment, access devices, access terminals, mobile stations, mobile subscriber units, mobile devices, user devices, and the like. Devices 104, 106 can be any type of communication device such as radios, mobile phones, mobile data terminals, Personal Digital Assistants (PDAs), laptops, two-way radios, cell phones, etc. The broadband device 106 supports the MIKEY protocol, while the narrowband device 104 only supports legacy key-management protocols that may be, for example, TETRA or APCO-25 protocols. It should be observed that the TETRA and APCO-25 protocols support key-management functions, such as key deletion and update, which are not supported by the MIKEY protocol.

In general, the KMF 102 and communication devices 104, 106 of system 100 are implemented using one or more (although not shown) memory devices, network interfaces, and processing devices that are operatively coupled, and which when programmed form the means for these system elements to implement their desired functionality, for example, as illustrated by reference to the methods and accompanying message structures shown in FIGS. 2-16.

The network interfaces are used for signaling or messaging (e.g., packets, datagrams, frames, superframes, or any other information blocks) between the KMF 102 and the devices 104, 106 of the system 100. The implementation of the network interfaces depends on whether the connection between the elements is wired or wireless. For example, the interfaces between two elements within system 100 can include one or more wired interfaces such as a serial port interface (e.g., compliant with the RS-232 standard), a parallel port interface, an Ethernet interface, a USB interface, and/or a FireWire interface, and the like. Where the interfaces support wireless communications, the interfaces comprise elements including processing, modulating, and transceiver elements that are operable in accordance with any one or more standard or proprietary wireless interfaces, wherein some of the functionality of the processing, modulating, and transceiver elements may be performed by means of the processing device through programmed logic such as software applications or firmware stored on the memory device of the system element or through hardware.

The processing device utilized by the elements of system 100 may be programmed with software or firmware logic or code for performing functionality described by reference to FIGS. 2-16; and/or the processing device may be implemented in hardware, for example, as a state machine or ASIC (application specific integrated circuit). The memory implemented by these system elements can include short-term and/or long-term storage of information needed for the functioning of the respective elements. The memory may further store software or firmware for programming the processing device with the logic or code needed to perform its functionality.

We now turn to a brief description of general functionality performed by the system elements shown in FIG. 1, which will aid in the understanding of the later description of the methods and message structures illustrated in FIGS. 2-16. The KMF 102 comprises a Key-Management Message (KMM) Controller Module 108 (e.g., implemented using a processing device and memory) that performs a forking process 110. The forking process 110 determines whether a message related to a key-management operation is destined to a narrowband or broadband device. If destined to a narrowband device 104, execution transitions to 112, where a KMM is constructed according to a legacy key-management protocol, such as TETRA or APCO-25. The constructed KMM is also known as an Over-the-Air Rekeying (OTAR) KMM. The constructed OTAR KMM is then sent to the narrowband device 104. Once the OTAR KMM is received by the narrowband device 104, the OTAR KMM is parsed at 114, where the OTAR KMM is analyzed and extracted. The extracted OTAR KMM is executed, at 116, on the narrowband device 104 to carry out the key-management operations defined by the OTAR KMM.

Turning back to the forking process 110, if the KMM is destined to a broadband device 106, execution transitions to 118, where an extended MIKEY message is constructed. One or more fields of the extended MIKEY message are used to signal and support the KMM that is related to a key-management operation not supported by the MIKEY protocol. For example, the key-management operation that is not supported by the MIKEY protocol might be key deletion, key activation, or key update. The extended MIKEY message, constructed at 118, is sent to the broadband device 106. The broadband device 106 parses the MIKEY message, at 120, to analyze and extract the KMM message, and at 122, the broadband device 106 executes the KMM message to carry out the key-management operation defined by the KMM.

Figure 2:
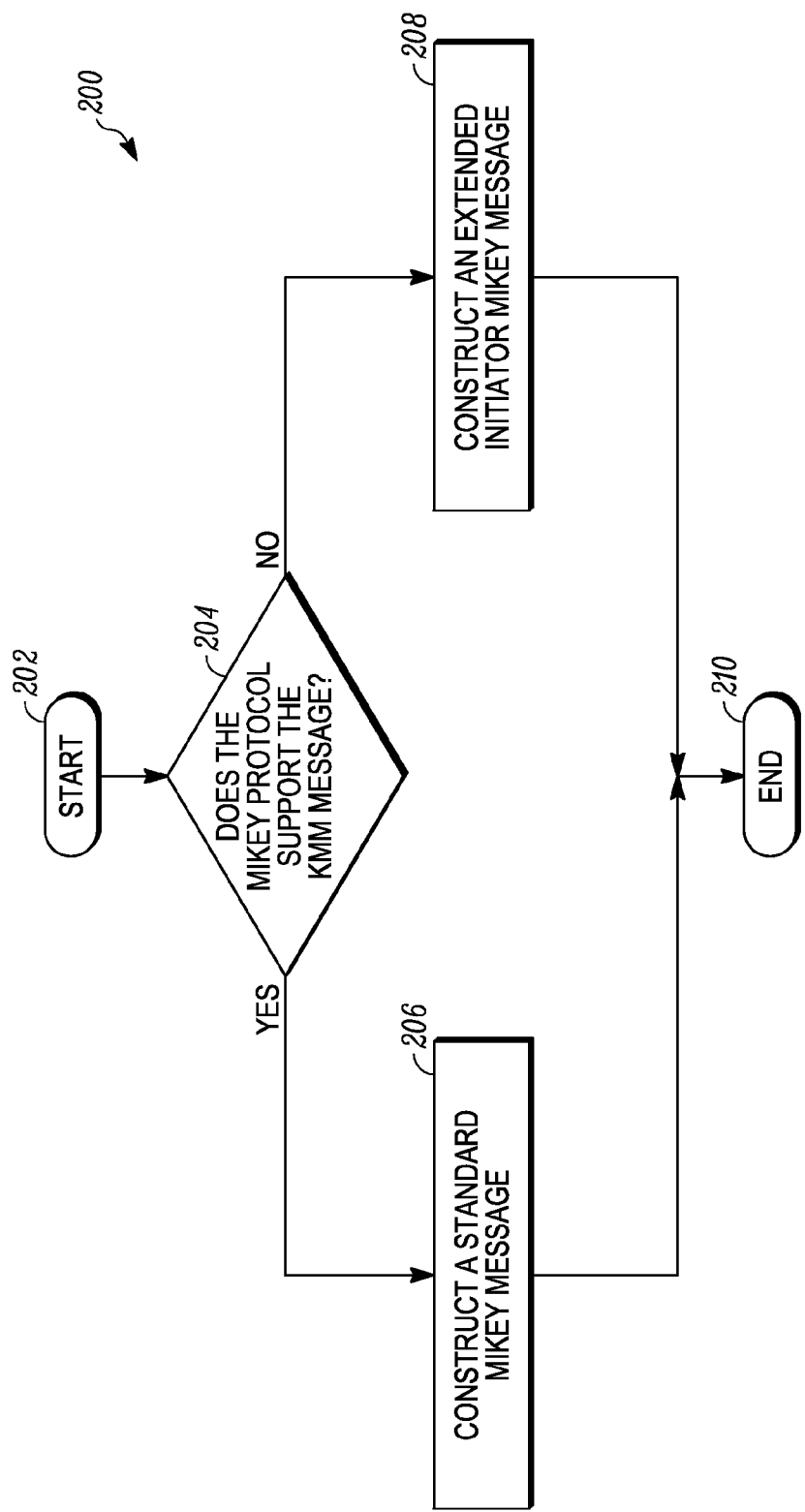
FIG. 2 is a logical flowchart illustrating a method in accordance with some embodiments.
Figure 3:
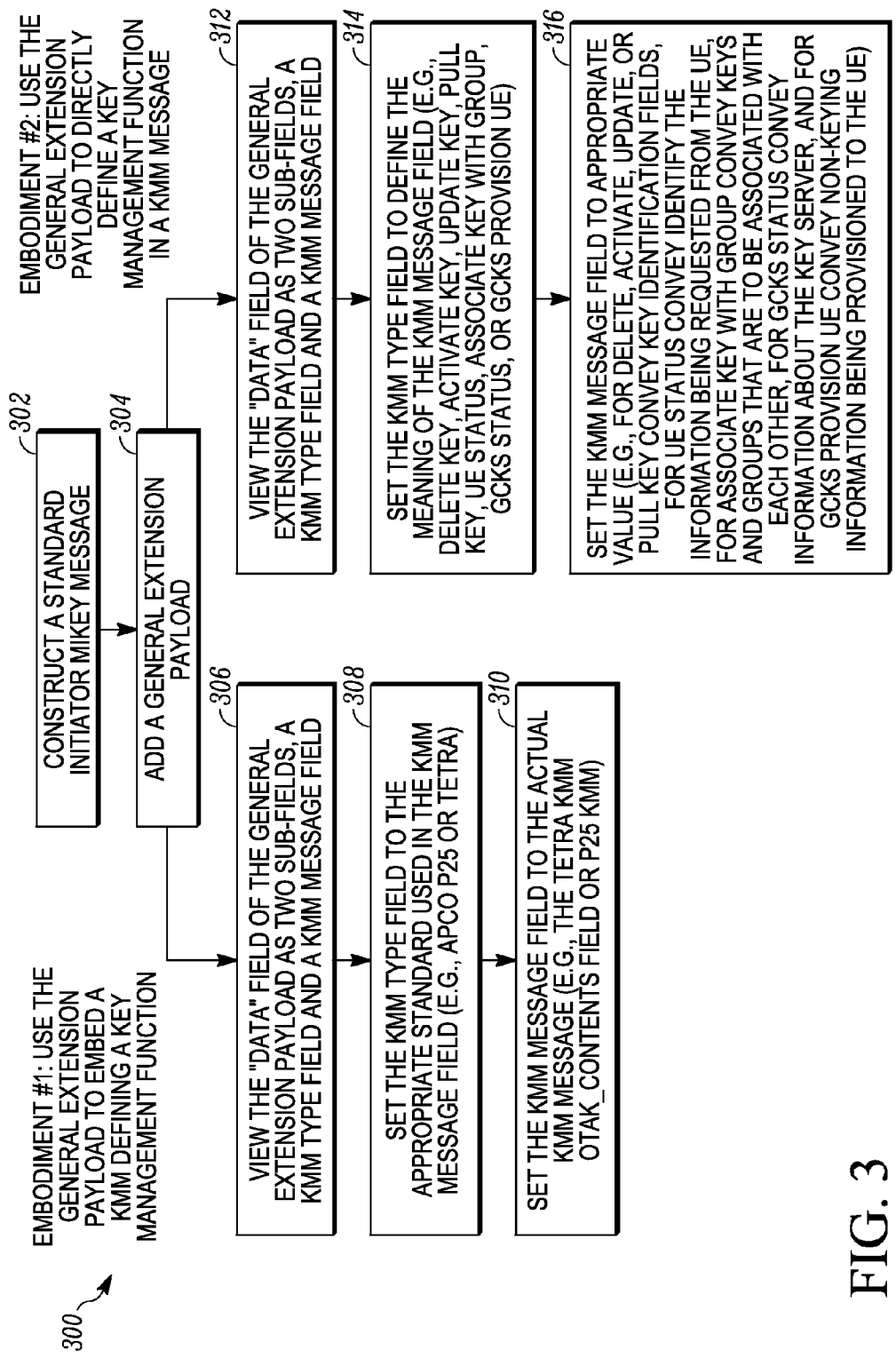
FIG. 3 is a logical flowchart illustrating a method in accordance with some embodiments.
Figure 4:
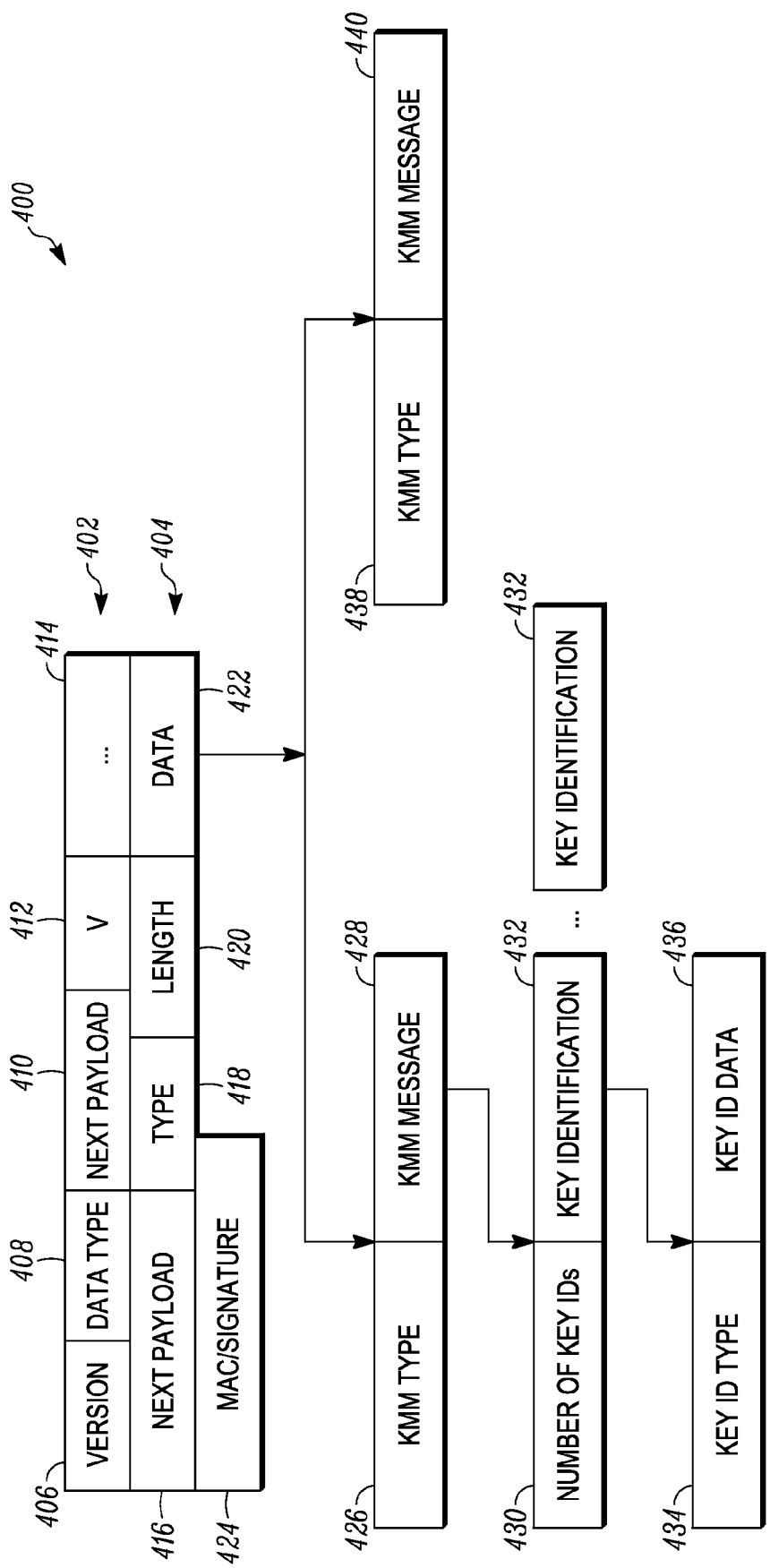
FIG. 4 illustrates a MIKEY message structure in accordance with some embodiments.

FIGS. 2-3 each illustrate a flow diagram showing a method for modifying the MIKEY protocol to support extended KMMs related to key-management operations that are not supported by the standard MIKEY protocol; while FIG. 4 illustrates an extended MIKEY message structure 100 (also referred to herein as an extended MIKEY message) constructed in accordance with the methods described by reference to FIG. 2 and FIG. 3. A MIKEY message is created by an initiator in the communication system 100. An initiator initiates the MIKEY protocol by creating and sending a MIKEY message; while a responder receives the MIKEY message and may further create and send a verification MIKEY message to the initiator. Moreover, the initiator can request this verification message by indicating a request in the initiation MIKEY message or such verification message can be mandated by the particular message (e.g., the initiator's standard MIKEY message for the Diffie-Hellman method mandates a verification message).

Alternatively, in accordance with the present disclosure, the responder can dynamically determine when to send a verification MIKEY message in response to a MIKEY message. For example, if a key-delete message is multicast to a group of recipients, only those recipients of this message that actually delete the key may be requested by the initiator to respond. Those recipients that have already deleted the key do not need to respond. In general, this alternative implementation applies where the KMM changes the state of the responder. This lets the KMF send out a KMM multiple times (e.g., to reach responders that may have been off the system when the previous KMM was sent) and not get inundated with responses from "all" of the responders each time. Only the "new" responders that receive the KMM for the first time will respond.

Referring to FIG. 2, a method 200 for modifying the MIKEY protocol to support extended KMMs is shown in accordance with the present disclosure. The method 200, which is performed by an initiator device in the communication system 100, starts at 202, where the initiator creates a MIKEY message. At 204, it is determined whether a KMM message related to a key-management operation is supported by the MIKEY protocol. In order to decide whether a key-management operation is supported by the standard MIKEY protocol in accordance with the teachings herein, a communication device has to be "aware" of or know about the key-management functions that are not supported by the MIKEY protocol. In one embodiment, this is provided through provisioning of the device with a table of key-management operations that the standard MIKEY protocol does not support.

Turning back to 204 of FIG. 2, if the KMM is supported by the MIKEY protocol, at 206 a standard MIKEY message is constructed according to the MIKEY protocol to implement the KMM message, for example to support one of the key-derivation procedures supported by standard MIKEY. Execution of the method 200 then transitions to 210, where the MIKEY message construction is completed. Turning back to 204, if the KMM is not supported by the MIKEY protocol, at 208 an extended MIKEY message is constructed to support the extended KMM. After 208, execution of the method 200 transitions to 210. Construction of the extended MIKEY message at 208 is further illustrated by reference to FIG. 3.

Turning momentarily to FIG. 4, an extended MIKEY message structure 400 includes a common header payload field 402, a general extension payload field 404, and a message authentication code (MAC) field 424. The common header payload 402 and the MAC 424, in most embodiments of the MIKEY message 400, are in conformance with standard MIKEY. However, the general extension payload 404 of MIKEY message 400 is utilized to implement embodiments in accordance with the present teachings. Moreover, often times, a MIKEY message contains one or more payloads (not shown) between the common header payload 402 and the general extension payload 404.

The MAC field 424 is a message authentication code created using authentication keys, it covers the entire MIKEY message, and it enables authentication of the MIKEY message. The common header payload 402 includes a version field 406, a data type field 408, a next payload field 410, a V field 412, and other header fields 414. The version field 406 is the version number of the MIKEY protocol. The data type field 408 defines the type of the MIKEY message, such as a public-key transport message, verification message, or error message. The next payload field 410 designates a payload (not shown) that immediately follows the common header payload 402. The other header fields 414 include other fields of a MIKEY message header.

The V field 412 indicates whether a verification MIKEY message is expected or not. The V field 412 is only set by the initiator. Generally, when the V field of a MIKEY message is set, a responder or verification MIKEY message should be created and sent by the responder after receiving the MIKEY message from the initiator. However, the V field 412 may have different meanings for different KMMs. For example, for a key deletion KMM, the V field 412 may indicate that a response is required when the responder actually deletes the key, and the response is not required when the key has already been deleted.

In the particular embodiments of FIG. 4, the general extension payload 404 comprises a next payload field 416, which is typically set to a value of 1 or 4 to indicate that the payload 404 is followed by a KEMAC or signature payload, respectively. Alternatively, for instance, the next payload field 416 may be set to a value that indicates the next payload (not shown) that immediately follows the payload 404. The general extension payload 404 also comprises a type 418 that specifies the type of data in a data field 422, while a length 420 specifies the length of the data field 222.

Referring now to FIG. 3, an illustrative method 300 for modifying the MIKEY protocol to support extended KMMs in accordance with the present disclosure is shown. Method 300 is performed by an initiator and is a further illustration of block 208 of FIG. 2. At 302, the initiator constructs a standard MIKEY message, and adds (304) a general extension payload 404 (FIG. 4) to the standard MIKEY message. Method 300 then transitions to one of two embodiments for using the general extension payload to signal an extended KMM. In a first embodiment, illustrated in blocks 306-310, the initiator uses the general extension payload to embed the extended KMM. In a second embodiment, illustrated in blocks 312-316, the initiator uses the general extension payload to directly define a key-management function in the KMM. In both embodiments, the initiator logically divides the general extension payload field 404 (more particularly the data subfield 422) into two subfields. In the first subfield, the initiator indicates a type of KMM, which identifies the key-management operation that is not supported by the MIKEY protocol; and the initiator inserts data corresponding to the type of KMM in the second subfield.

More particularly, in accordance with the first embodiment, at 306, the initiator "views" or in other words logically divides the data subfield 422 (FIG. 4) (within the general extension payload field 404) into two subfields: a KMM type subfield 438 (FIG. 4) and a KMM message subfield 440 (FIG. 4). At 308, the initiator sets the KMM type subfield 438 to a value indicating the standard or protocol under which an extended KMM (in this case a legacy KMM) stored in the KMM message subfield 440 is constructed. For example, the KMM type subfield 438 is set to a value of 6 if the extended KMM is a TETRA message, or a value of 7 if the extended KMM is an APCO-25 message.

At 310, the initiator sets the KMM message subfield 440 to the data corresponding to the KMM type, which in this case is the actual extended KMM message, which comprises, for instance, a key-management protocol message constructed using a separate key-management protocol. For example, the KMM message subfield 440 is set to a TETRA KMM OTAK_CONTENTS message. It should be noted that, in this particular embodiment, the initiator does not need to know the specific data format or key-management operation of the extended KMM message; the extended KMM message conforming to the different protocol is simply embedded into the general extension payload field of the MIKEY message. When the KMM message subfield 440 includes an embedded TETRA or APCO-25 message, the KMM message subfield 440 portion of the extended MIKEY message 400 does not need to be encrypted, because the TETRA or APCO-25 KMM message is already secured. However, the embedded KMM message may still need to be authenticated.

In addition, in another illustrative implementation, the type subfield 418 (FIG. 4) is used and set to signal the presence of a KMM in the data subfield 422. Alternatively, the type subfield 418 is used to indicate the type of standard or protocol under which the extended KMM message is constructed. In this particular alternate embodiment, the KMM type field 438 is no longer needed, and the data subfield 422 comprises only the extended KMM.

Turning back to the second embodiment shown in FIG. 3, at 312, the initiator "views" or in other words logically divides the data subfield 422 (FIG. 4) into two subfields: a KMM type subfield 426 (FIG. 4) and a KMM message subfield 428 (FIG. 4). At 314, the initiator sets the KMM type subfield 426 to a value signaling a meaning or type of extended KMM related to a key-management operation that is not supported by the standard MIKEY protocol. For example, the type of KMM is key deletion or key activation. Referring momentarily to FIG. 15, a table 1500 defines a list of extended key-management functions not supported by the MIKEY protocol in accordance with some embodiments. The table 1500 includes a KMM type column 1502 that defines the types of key-management functions and a KMM description column 1504 that describes these key-management functions. For example, a key-deletion operation is a type with a value of 0x01, and a key-update operation is a type with a value of 0x05.

Turning back to the second embodiment shown in FIG. 3, at 316, the initiator sets the KMM message subfield 428 to include data corresponding to the key-management operation defined by the value set in the KMM type subfield 426. For example, if the KMM type is key deletion, key activation, key update, or key pull, then the KMM message subfield 428 is set to specify the corresponding keys. If the KMM type is User Equipment (UE) status, then the KMM message subfield 428 is set to specify keys for which status is being requested. If the KMM type is key association with a group, then the KMM message subfield 428 is set to specify the keys and groups that are to be associated with each other. If the KMM type is Group Controller/Key Server (GCKS) status, then the KMM message subfield 428 is set to specify the key server. If the KMM type is GCKS provision UE, then the KMM message subfield 428 is set to specify non-keying information being provisioned into the UE. In addition, the type field 418 (FIG. 4) may be used and set to indicate the presence of an extended KMM in the data subfield 422 (FIG. 4). Alternatively, the type subfield 418 is used to signal the type of KMM, such as key deletion or activation. In this alternate embodiment, the KMM type subfield 426 is no longer needed, and the data subfield 422 comprises only the data corresponding to the identified KMM type.

In a further illustrative implementation, the KMM message subfield 428 (FIG. 4) is viewed as (logically divided into) two or more subfields: e.g., a number of key IDs subfield 430 and one or more key identification subfields 432, when the KMM type subfield 426 is, for example, key deletion or some other key-management operation. The number of key IDs subfield 430 specifies the number of key identification subfields 432 in the KMM message subfield 428. Each key identification subfield 432 specifies the keys, groups of keys, or types of keys that are being managed and manipulated. For example, if the KMM type is key deletion, then each key identification subfield 432 specifies a key to be deleted.

Moreover, each key identification subfield 432 comprises a key ID type subfield 434 followed by a key ID data subfield 436. The key ID type subfield 434 specifies a type of the key ID data that is included in the subfield 436. To identify keys, an approach taken by 3rd Generation Partnership Project (3GPP) in secure Multimedia Broadcast/Multicast Service (MBMS) is utilized in some embodiments. An MBMS Service Key (MSK) is identified by a Key Domain ID (KDID) and MSK ID. The Key Domain ID is 3 bytes long and includes the Mobile Country Code (MCC) and Mobile Network Code (MNC), where MCC identifies the country of the radio network and MNC identifies the radio network in that country. An MSK ID consists of 4 bytes, where bytes 0 and 1 contain a Key Group part (GRP), and bytes 2 and 3 contain a Key Number part (NUM). An MBMS Traffic Key (MTK) is identified by the KDID, the MSK ID, and a 2-byte MTK ID.

Figure 16:
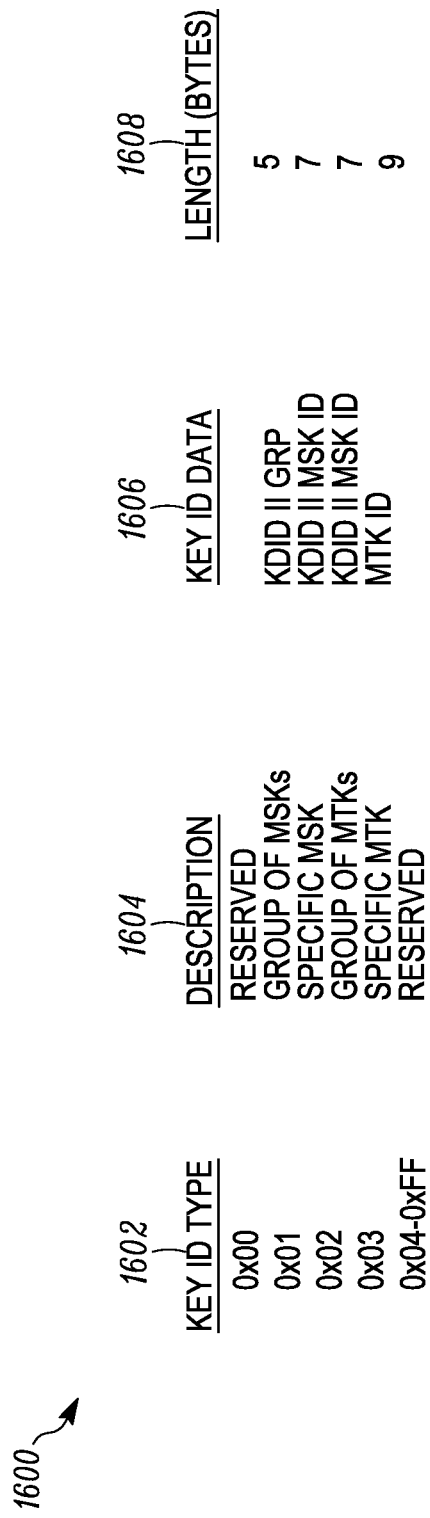
FIG. 16 illustrates a list of key identification types in accordance with some embodiments.

The key ID type subfield 434 (FIG. 4) and the key ID data subfield 436 (FIG. 4) can be further understood by referring to FIG. 16. Referring momentarily to FIG. 16, a table 1600 defines a list of key identification types in accordance with some embodiments. The table 1600 includes a key ID type column 1602 that specifies values of different key ID types that can be designated in subfield 434. A description column 1604 describes the key ID types defined by the key ID type column 1602. A key ID data column 1606 specifies a format and content of key data that is set in the key ID data subfield 436 (FIG. 4) for each type of key ID, where a length column 1608 specifies the length of the key data defined in the key ID data column 1606. For example, when the key ID type subfield 434 has a value of 0x01, the type of the key ID data included in subfield 436 is a group of MSKs, and the key ID data subfield 436 contains a KDID and GRP. Similarly, when the key ID type subfield 434 has a value of 0x02, the type of the key ID data included in subfield 436 is a specific MSK, and the key ID data subfield 436 contains a KDID and MSK ID.

Figure 5:
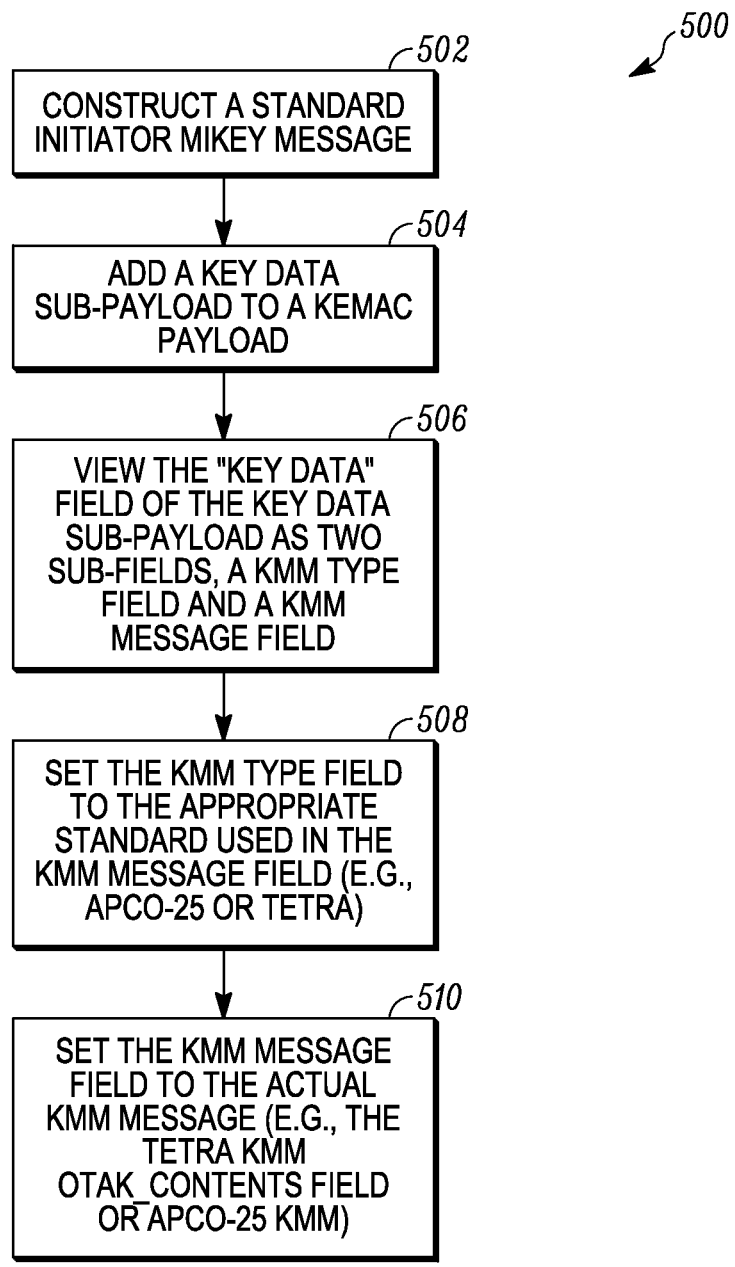
FIG. 5 is a logical flowchart illustrating a method in accordance with some embodiments.
Figure 6:
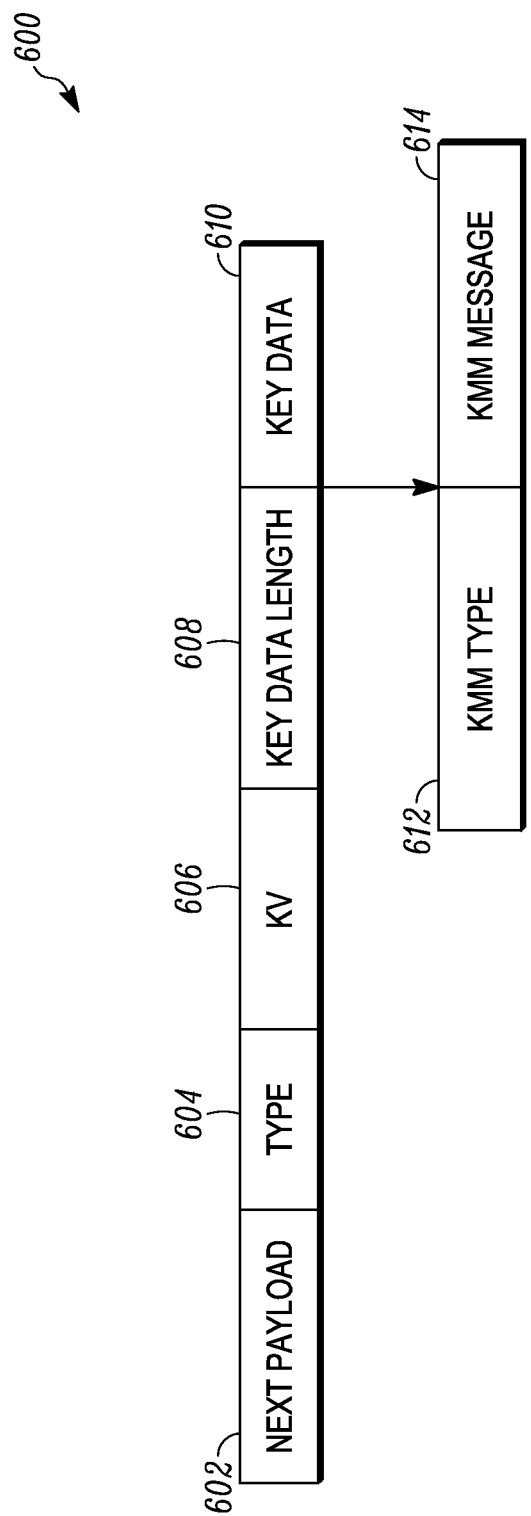
FIG. 6 illustrates a key data sub-payload structure in accordance with some embodiments.

A method for extending the MIKEY protocol to support extended KMMs using a Key Data Transport Payload (KEMAC) field, rather than a general extension payload field, is illustrated in FIG. 5. Referring now to FIG. 5, a method 500 of modifying the MIKEY protocol to support extended KMMs defining key-management operations that are not supported by the standard MIKEY protocol is shown in accordance with the present teachings. The method 500 uses a Key Data Transport Payload (KEMAC) field (also referred to herein as a KEMAC payload) and a key data sub-payload (within the KEMAC) to construct an extended MIKEY message; and method 500 is also performed by an initiator. The method 500 starts at 502, where the initiator constructs a standard MIKEY message having a KEMAC payload. At 504, the initiator adds a key data sub-payload to the KEMAC payload of the constructed MIKEY message. The key data sub-payload is further illustrated in FIG. 6, where an illustrative key data sub-payload 600 constructed in accordance with the method 500 is shown. Referring momentarily to FIG. 6, the key data sub-payload 600 includes a next payload 602 that identifies a payload (not shown) that immediately follows the key data sub-payload 600. The next payload 602 is set to a value of 0 if there are no additional payloads after the key data sub-payload 600. The key data sub-payload 600 also includes a KV subfield 606 that indicates the type of key validity period specified. In addition, a type subfield 604 indicates the type of key data stored in a key data subfield 610, while a key data length subfield 608 specifies the length of data in the key data subfield 610. Alternatively, for instance, a KEMAC payload may be utilized to contain an extended KMM, and a general extension payload is used to signal the inclusion of the extended KMM in the KEMAC payload.

Turning back to FIG. 5, method 500 continues at 506 where the initiator "views" (logically divides) the key data subfield 610 (FIG. 6) into two subfields: a KMM type subfield 612 (FIG. 6) and a KMM message subfield 614 (FIG. 6). At 508, the initiator sets the KMM type subfield 612 to a value indicating the standard or protocol according to which a KMM (in the message subfield 614) is constructed. For example, the KMM type subfield 612 is set to a value of 7 to signal that the KMM in the subfield 614 is a TETRA message and a value of 8 to signal that the KMM in the subfield 614 is an APCO-25 message. The initiator further sets (510) the KMM message subfield 614 to include the actual extended KMM, constructed according to a different protocol, such as TETRA or APCO-25. The extended KMM set in the KMM message subfield 614 defines a key-management operation that is not supported by the MIKEY protocol. It should be noted that, in this embodiment, the initiator does not need to know the specific data format or key-management operation stored in the KMM message contained in the KMM message subfield 614; the KMM conforming to the different protocol is simply embedded into the extended MIKEY message.

Figure 7:
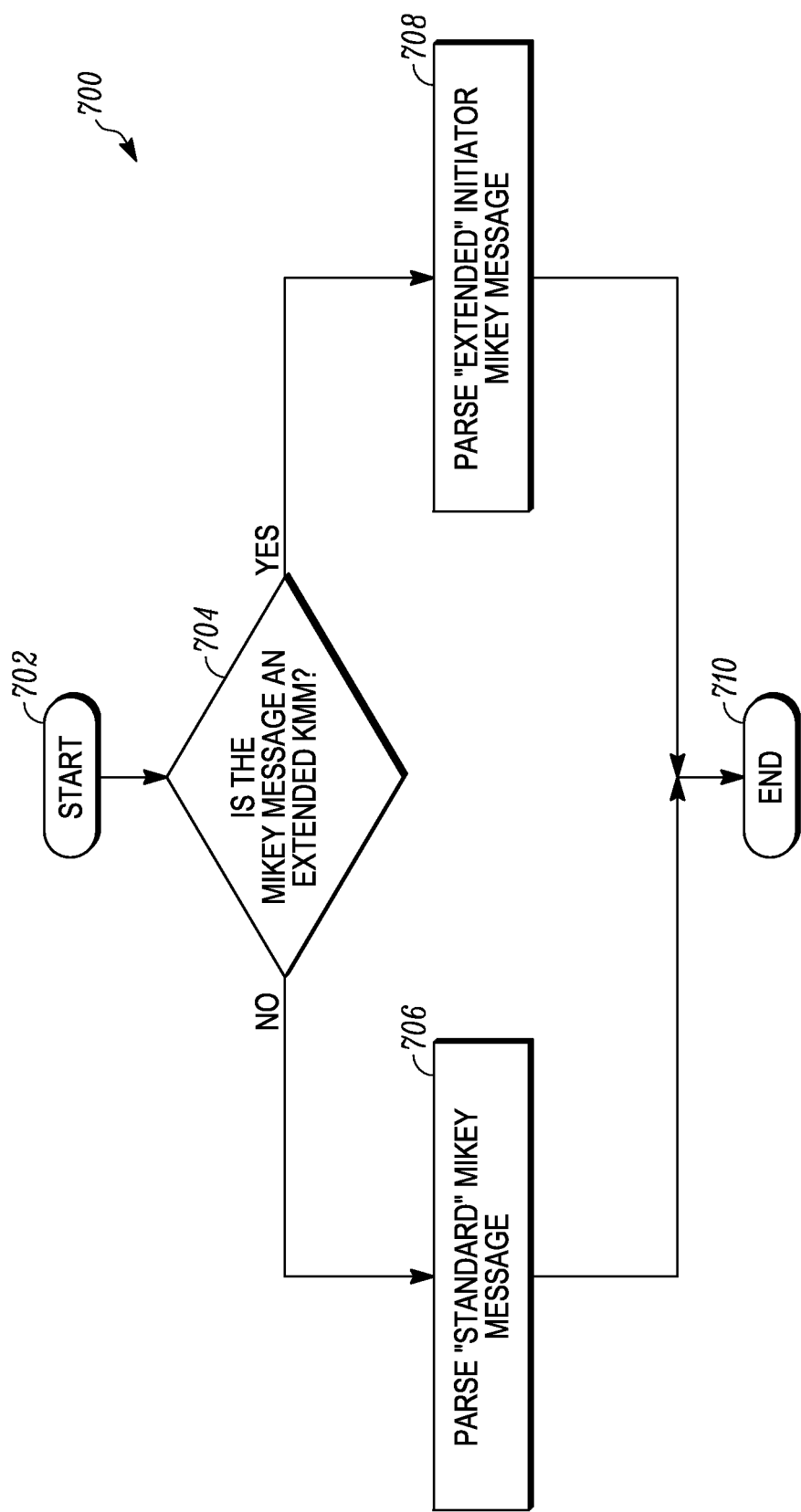
FIG. 7 is a logical flowchart illustrating a method in accordance with some embodiments.
Figure 8:
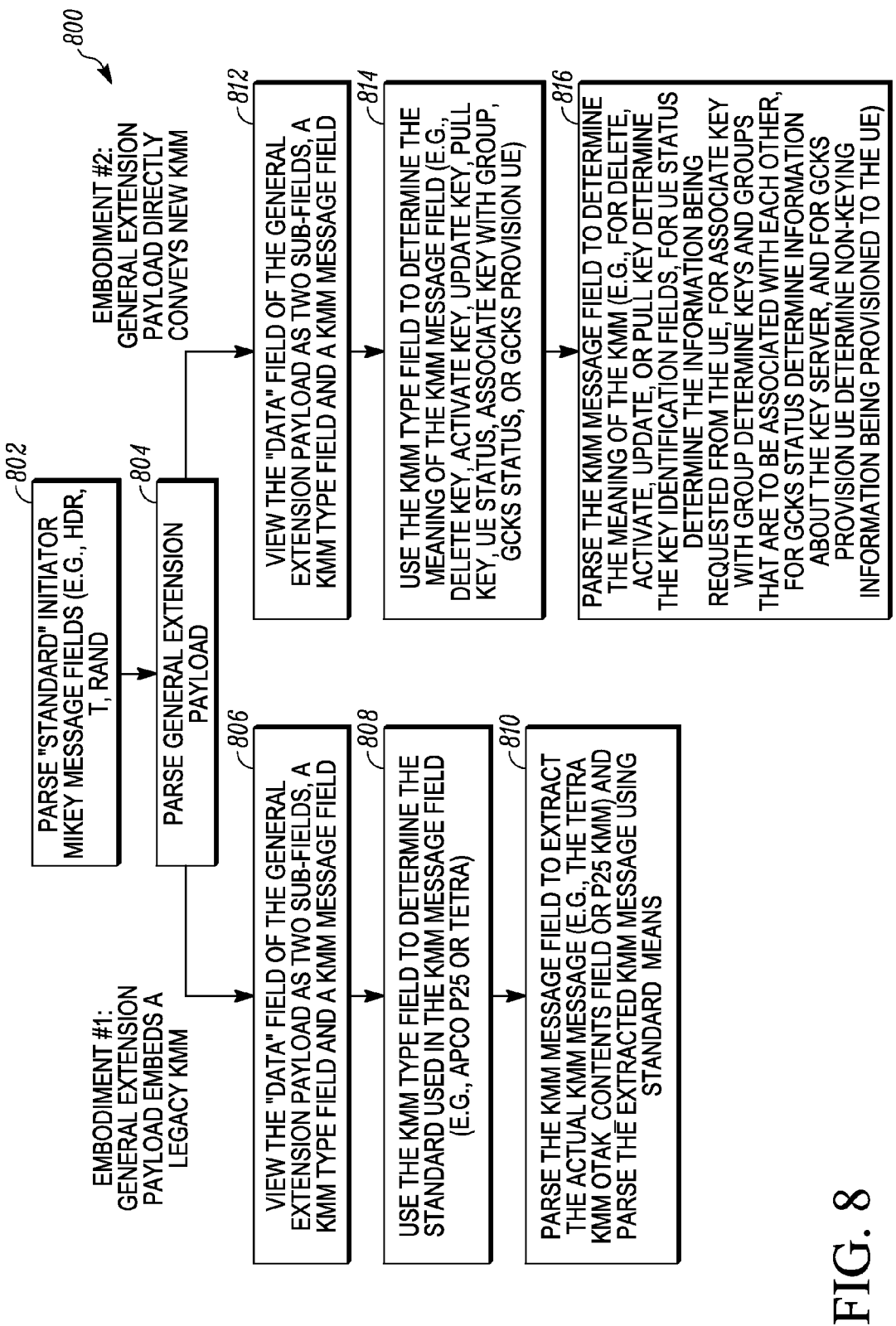
FIG. 8 is a logical flowchart illustrating a method in accordance with some embodiments.
Figure 9:
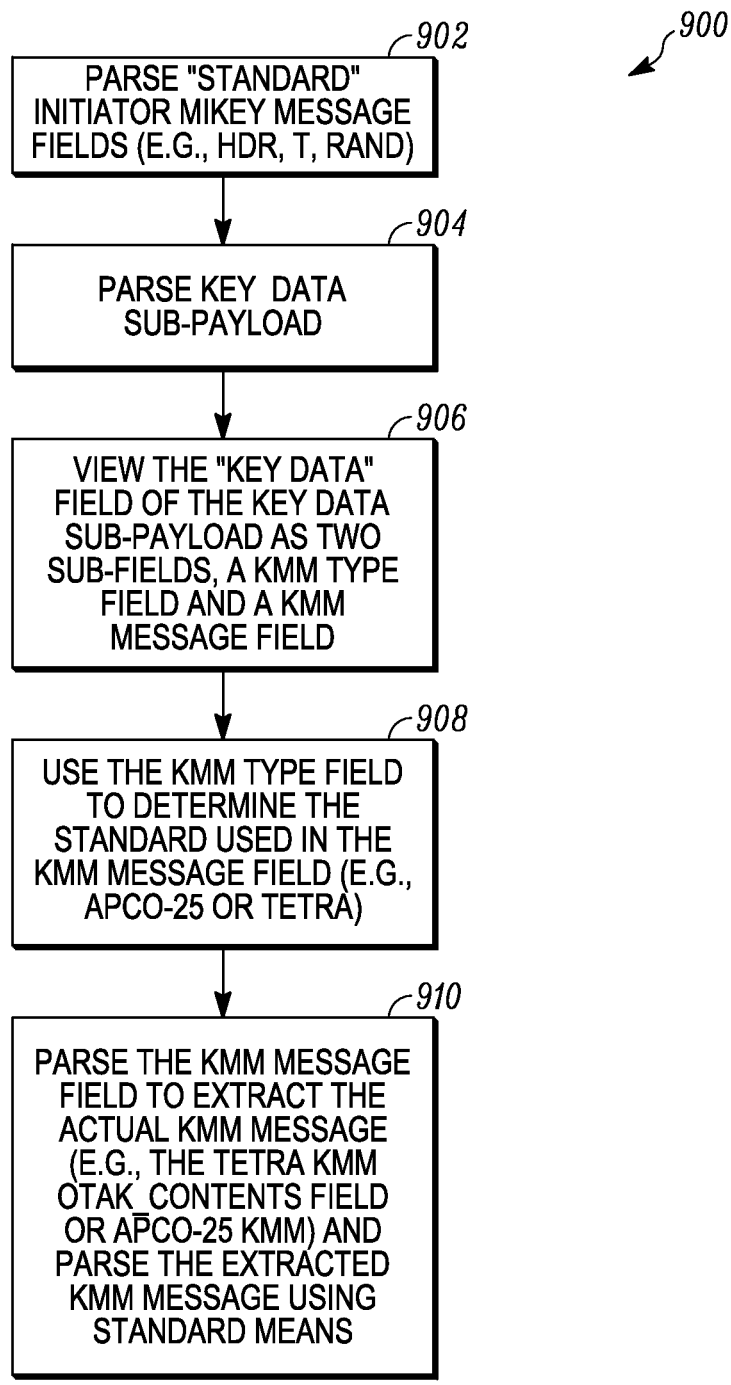
FIG. 9 is a logical flowchart illustrating a method in accordance with some embodiments.

After the extended MIKEY message supporting an extended KMM is constructed, the MIKEY message is sent to a receiving (responder) device, such as the broadband device 106 (FIG. 1). At the broadband device 106, the received MIKEY message is first parsed at 120 to extract the extended KMM and then the extended KMM is executed at 122 (FIG. 1). FIGS. 7-9 each illustrate a flow diagram showing a method, performed at the responder, for parsing a MIKEY message, in accordance with the present disclosure, to extract the extended KMM.

Referring first to FIG. 7, a method 700 for parsing a MIKEY message starts at 702. At 704, the responder determines whether the MIKEY message is a standard or an extended MIKEY message For example, a MIKEY message is not a standard MIKEY message (and is therefore an extended MIKEY message) if a general extension payload field 404 (FIG. 4) in the MIKEY message is detected, and the type subfield 418 (FIG. 4) has a value indicating: that the data 422 (FIG. 4) contains a TETRA or APCO-25 message; a particular key-management operation not supported by standard MIKEY; or the presence of an extended KMM. Alternatively, the responder detects that the MIKEY message contains an extended KMM where the KMM type subfield 438 (FIG. 4) specifies a key-management protocol according to which a KMM is constructed and contained in the KMM message 440 (FIG. 4); or the KMM type subfield 426 (FIG. 4) specifies a type of key-management operation.

In addition, the MIKEY message is viewed as an extended MIKEY message, not a standard MIKEY message, if the MIKEY message is detected to comprise a KEMAC payload, and the KEMAC payload comprises a key data sub-payload that implements an extended KMM. A key data sub-payload implements an extended KMM if, for example, the type subfield 604 (FIG. 6) of the payload signals that the key data subfield 610 (FIG. 6) contains an extended KMM that is not supported by the standard MIKEY protocol or the general extension payload field 404 indicates that the KEMAC payload contains an extended KMM.

Turning back to block 704 in FIG. 7, if the MIKEY message is a standard MIKEY message, the responder parses (706) the standard MIKEY message; and then execution of the method 700 transitions to 710, where the parsing process is completed. Alternatively, at 704, if the MIKEY the responder determines that the MIKEY message comprises an extended KMM, the responder parses (708) the extended MIKEY message, and execution of the method 700 transitions to 710. Block 708, wherein the responder parses the MIKEY massage having the extended KMM, is further illustrated by reference to FIGS. 8 and 9.

FIGS. 8 and 9 each illustrate a flow diagram showing a method for parsing an extended MIKEY message in accordance with the present teachings. Referring first to FIG. 8, a method 800 for parsing an extended MIKEY message supporting an extended KMM through a general extension payload is shown in accordance with the present disclosure. Method 800 starts at 802, where the responder parses the standard MIKEY message fields, such as the common header payload (HDR) and the RAND payload. At 804, the responder parses the general extension payload. Described (with respect to method 800) are two embodiments for parsing the general extension payload field, i.e., a first embodiment where the general extension payload field embeds a "legacy" or standard KMM (constructed in conformance with a different key management protocol); and a second embodiment where the general extension payload field directly conveys, signals, or indicates the extended KMM.

In the first embodiment, based on the value in the general extension payload's type subfield 418, the responder determines that the general extension payload contains a legacy KMM. Accordingly, the responder, at 806, views the data subfield 422 (FIG. 4) as two subfields: a KMM type subfield 438 (FIG. 4) and a KMM message subfield 440 (FIG. 4). At 808, the responder uses the value in the KMM type 438 to detect the protocol according to which the legacy KMM contained in subfield 440 is constructed and then, at 810, parses the KMM message subfield 440 to extract the actual KMM, which defines a key-management operation that is not supported by standard MIKEY. The responder executes the extracted KMM, for example, in block 122 of the broadband device 106 (FIG. 1)

Turning back to 804 in FIG. 8, in the second embodiment, based on the value in the general extension payload's type subfield 418, the responder determines that the general extension payload defines a key-management operation that is not supported by the standard MIKEY protocol. Accordingly, at 812, the responder views the data subfield 422 (FIG. 4) of the general extension payload as two subfields: a KMM type subfield 426 (FIG. 4) and a KMM message subfield 428 (FIG. 4). At 814, the responder uses the value in the KMM type subfield 426 to detect the key-management operation, such as key deletion and activation, which the KMM message subfield 428 specifies. At 816, the responder parses the KMM message subfield 428.

For example, when the KMM type subfield 426 is key deletion, the responder views the KMM message subfield 428 as two or more subfields: a number of key IDs subfield 430 (FIG. 4) and one or more key identification subfields 432 (FIG. 4). The responder uses the value in the number of key IDs subfield 430 to determine the number of key identification subfields 432 fields. The responder further views each key identification subfield 432 as two subfields: a key ID type subfield 434 (FIG. 4) and a key ID data subfield 436 (FIG. 4). The responder uses the value in the key ID type subfield 434 to detect the type of the key data in the key ID data subfield 436. After parsing the KMM message subfield 428, the responder deletes the key defined by the key ID data subfield 436, for example, in block 122 of the broadband device 106 (FIG. 1).

Referring now to FIG. 9, a method 900 for parsing an extended MIKEY message supporting an extended KMM through a key data sub-payload is shown in accordance with the present disclosure. Method 900 starts at 902, where the responder parses the standard MIKEY message fields (e.g., the HDR, the RAND, and the timestamp payload (T)). At 904, the responder parses the key data sub-payload. At 906, in one particular embodiment, the responder detects that the type subfield 604 (FIG. 6) of the key data sub-payload indicates that the key data subfield 610 (FIG. 6) contains an extended KMM; alternatively the general extension payload field provides such an indication of the inclusion of the extended KMM in the key data subfield 610.

The responder views (906) the key data subfield 610 as two subfields: a KMM type subfield 612 (FIG. 6) and a KMM message subfield 614 (FIG. 6). At 908, the responder uses the value in the KMM type subfield 612 to determine the key-management protocol, according to which the KMM in the message subfield 614 is constructed. For example, the KMM type subfield 612 indicates that the standard used to construct the KMM is either the TETRA or the APCO-25 standard. The responder then parses (910) the KMM message subfield 614 to extract the actual KMM for execution, for example, in block 122 of the broadband device 106 (FIG. 1).

Figure 10:
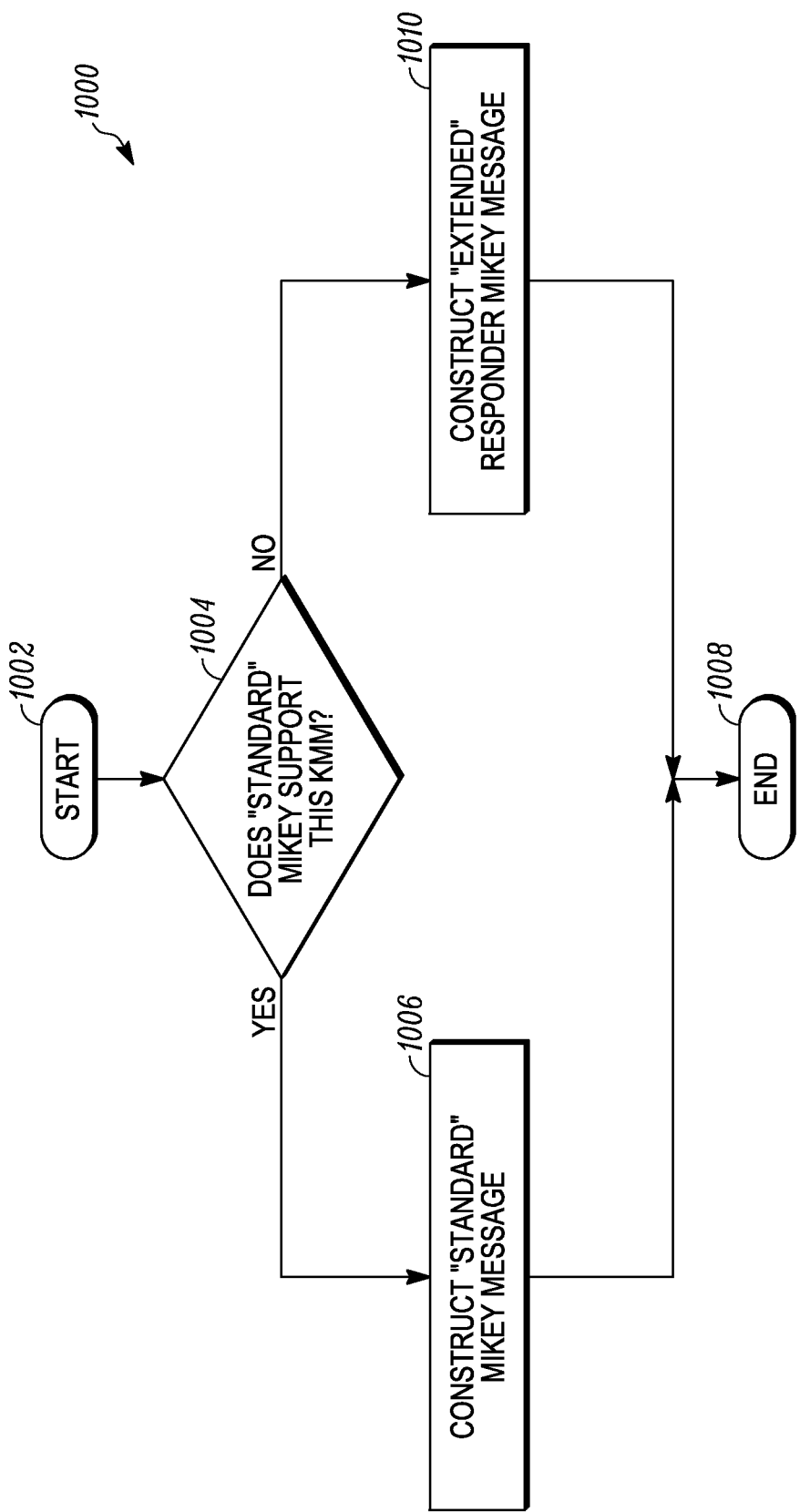
FIG. 10 is a logical flowchart illustrating a method in accordance with some embodiments.
Figure 11:
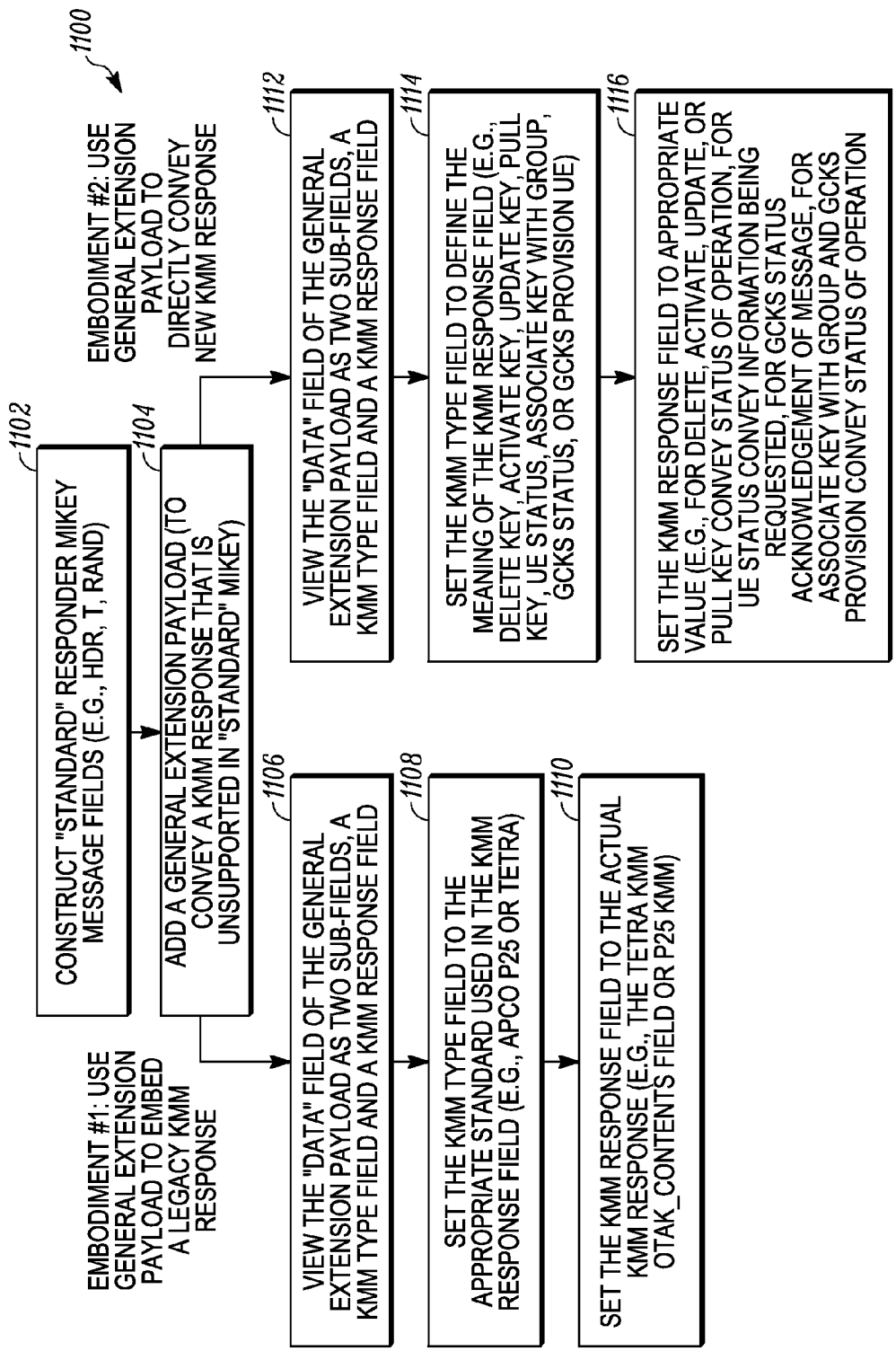
FIG. 11 is a logical flowchart illustrating a method in accordance with some embodiments.

Often times, it is desirable for the initiator to receive a responder MIKEY message in response to a MIKEY message that was sent to the responder. For example, if the V field 412 (FIG. 4) of a MIKEY message is set, then a recipient of the MIKEY message should respond by creating and sending a responder MIKEY message. FIGS. 10-11 illustrate a method, performed in the responder, for constructing an extended responder MIKEY message in response to an extended MIKEY message supporting an extended KMM in accordance with the present teachings.

Referring in particular to FIG. 10, a method 1000 for constructing an extended responder MIKEY message starts at 1002. At 1004, the responder determines whether the standard MIKEY protocol supports the response to the KMM. If the standard MIKEY protocol supports the response to the KMM, then, at 1006, the responder constructs a standard responder MIKEY message, and the method 1000 ends at 1008. Turning back to 1004, if the standard MIKEY protocol does not support the response to the KMM, the responder instead constructs (1010) an extended responder MIKEY message in response to the extended MIKEY message, and the method 1000 again ends at 1008. The responder's detailed execution of block 1010 is illustrated by reference to the flow diagram shown in FIG. 11.

Referring to FIG. 11, a method 1100 of constructing an extended responder MIKEY message is shown in accordance with the present disclosure. Method 1100 starts at 1102, where the responder constructs standard responder MIKEY message fields, such as HDR and RAND. At 1104, the responder adds a general extension payload field to the constructed standard responder MIKEY message. In an alternate embodiment, a KEMAC payload field and a key data sub-payload within the KEMAC payload field, rather than a general extension payload field, is added to convey a KMM response that is not supported by the standard MIKEY protocol. The general extension payload field is further illustrated in FIG. 12.

Figure 12:
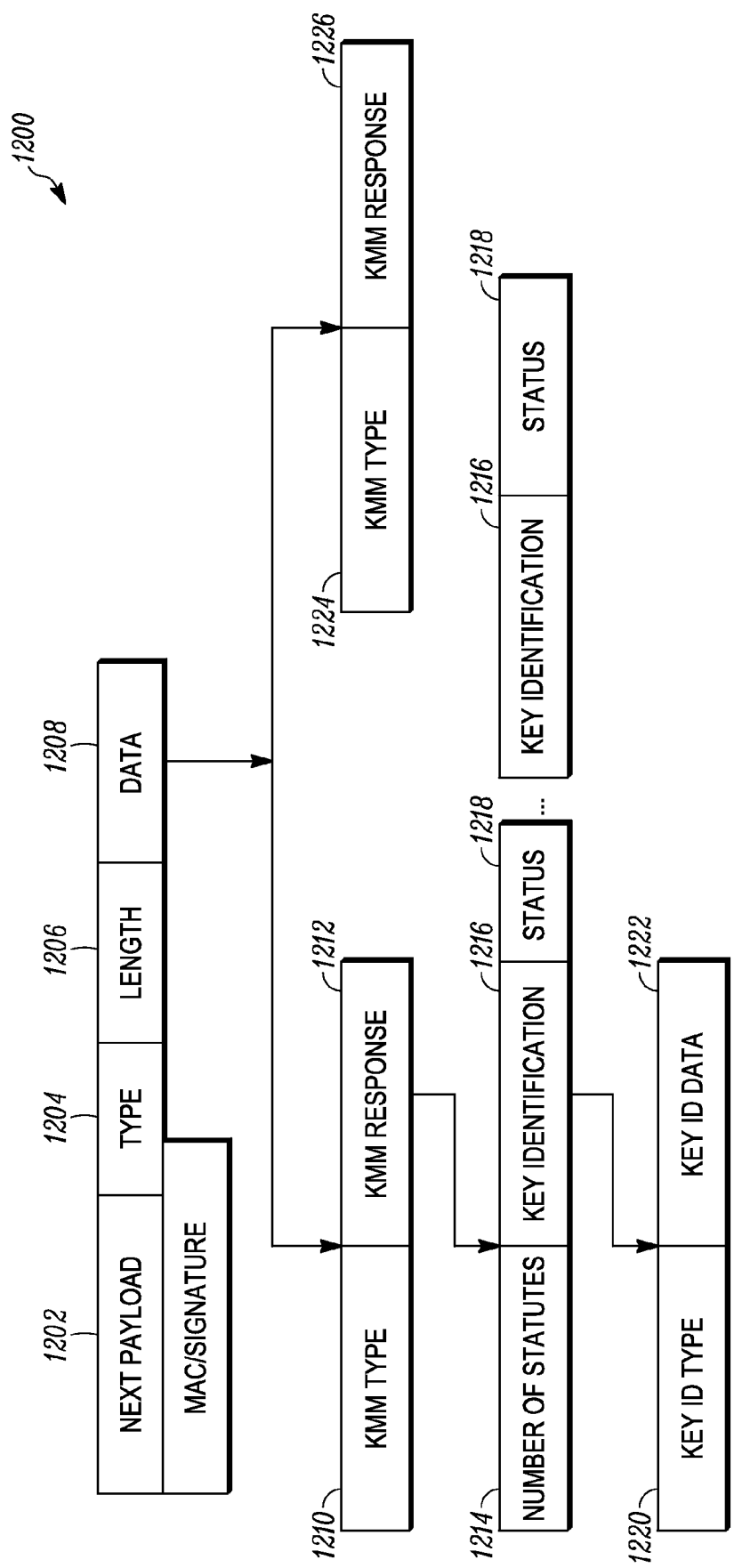
FIG. 12 illustrates a responder MIKEY message structure in accordance with some embodiments.

Referring momentarily to FIG. 12, a general extension payload 1200 in accordance with the present teachings is shown. The payload 1200 comprises a next payload subfield 1202, which is set to a value of 1 or 4 to indicate that the payload 1200 is message KEMAC or signature payload, respectively. Alternatively, for instance, the next payload subfield 1202 may be set to a value that indicates the next payload (not shown) that immediately follows the payload 1200. The payload 1200 also includes a type subfield 1204 that specifies the type of data in a data subfield 1208, while a length subfield 1206 specifies the length of the data subfield 1208.

Turning back to 1104 (FIG. 11), method 1100 supports two embodiments for constructing an extended responder MIKEY message, i.e., a first embodiment where the responder uses the general extension payload field to embed a legacy KMM response and a second embodiment where the responder uses the general extension payload field to directly convey an extended KMM response. In the first embodiment, the responder views (logically divides) (1106) the data subfield 1208 into two subfields: a KMM type subfield 1224 (FIG. 12) and a KMM response subfield 1226 (FIG. 12). At 1108, the responder sets the KMM type subfield 1224 to a value indicating the key-management protocol according to which the legacy KMM response contained in subfield 1226 is constructed. For example, the KMM type subfield 1224 may indicate the TETRA protocol or the APCO-25 protocol. At 1110, the responder sets the KMM response subfield 1226 to the actual responder KMM, or in other words includes the legacy responder KMM in the subfield 1226. Therefore, the actual responder KMM message is embedded in the extended responder MIKEY message.

Turning back to block 1104 (FIG. 11), in the second embodiment, the responder views (1112) the data subfield 1208 as two subfields: a KMM type subfield 1210 (FIG. 12)

and a KMM response subfield 1212 (FIG. 12). At 1114, the responder sets the KMM type subfield 1210 to a value that defines the type of the KMM response contained in subfield 1212, such as response to key deletion or key update.

At 1116, the responder sets the KMM response subfield 1212 to appropriate values. For example, in a response to an extended KMM defining a key-deletion operation, the KMM response subfield 1212 is viewed as three or more subfields: a number of statuses subfield 1214 (FIG. 12), one or more key identification subfields 1216, and one or more status subfields 1218. The number of statuses subfields 1214 specifies the number of key identification subfield 1216 and status subfield 1218 pairs. The key identification subfield 1216 describes a key that was requested to be deleted. The key identification subfield 1216 is, likewise, viewed as two subfields: a key ID type subfield 1220 and key ID data subfield 1222. The key ID type subfield 1220 is substantially the same as the key ID type subfield 434 (FIG. 4), and the key ID data subfield 1222 is substantially the same as the key ID data subfield 436 (FIG. 4). The status subfield 1218 describes the status of, for example, a key deletion operation on the key described by the corresponding key identification subfield 1216. For instance, in accordance with one implementation scenario, a value of 0x00 in the status subfield 1218 signals a successful key deletion, while a value of 0x01 signals that the key to be deleted was not found. It should be noted that more values may be used to signal various statuses.

Figure 13:
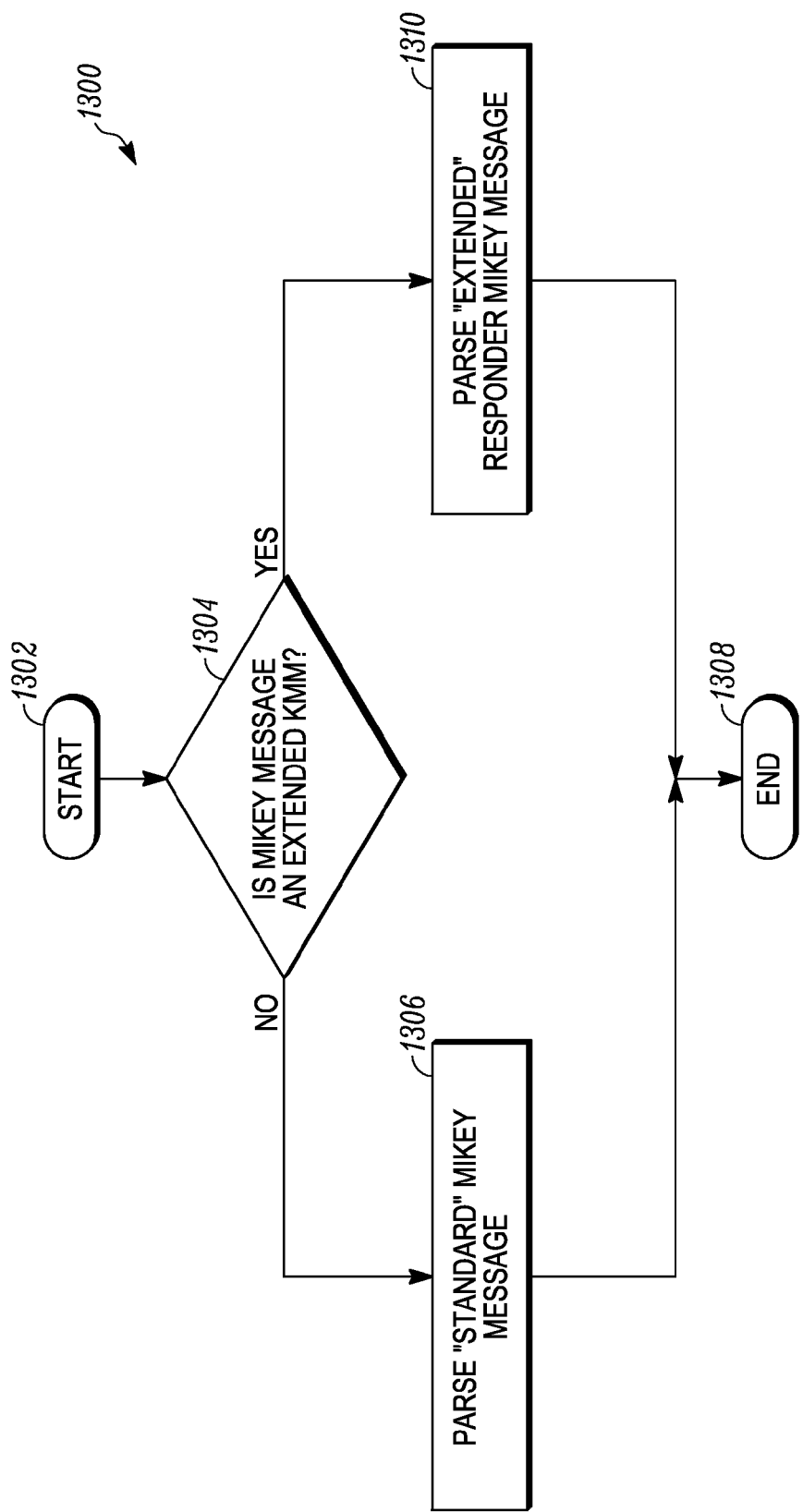
FIG. 13 is a logical flowchart illustrating a method in accordance with some embodiments.
Figure 14:
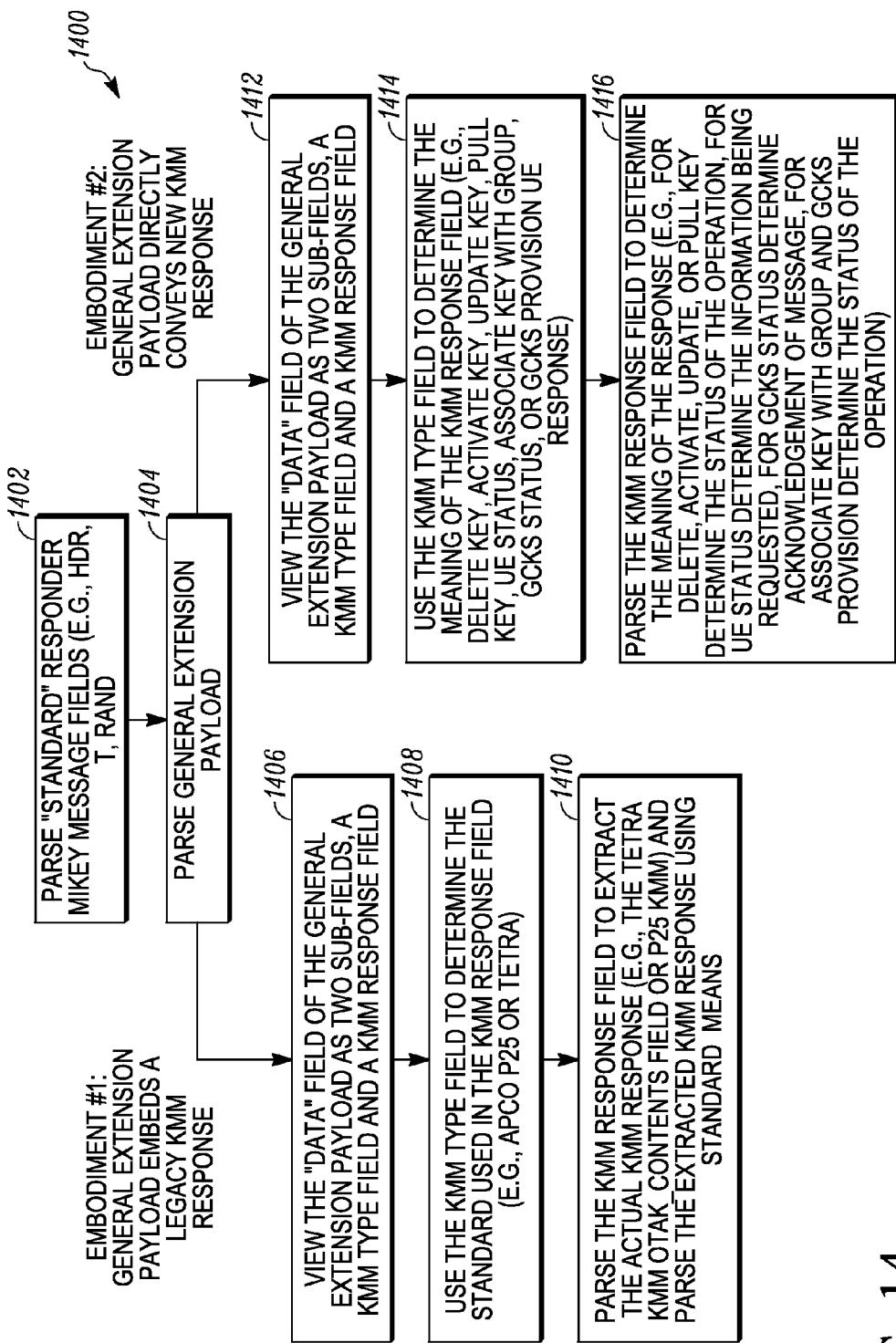
FIG. 14 is a logical flowchart illustrating a method in accordance with some embodiments.

FIGS. 13-14 illustrate a method, performed at the initiator, for parsing a responder MIKEY message after the message is constructed (at the responder), sent, and received (by the initiator). Referring in particular to FIG. 13, a method 1300 for parsing a responder MIKEY message in accordance with the present disclosure is shown. Method 1300 starts at 1302. At 1304, the initiator determines whether a received MIKEY message is an extended responder MIKEY message or a standard responder MIKEY message. For example, the received MIKEY message is an extended responder MIKEY message if a general extension payload in the MIKEY message is detected, and the general extension payload's type subfield 1204 (FIG. 12) has a value indicating that the data subfield 1208 implements an extended KMM response. If the received MIKEY message is a standard responder MIKEY message, execution then transitions to 1306, where the initiator parses the standard responder MIKEY message; and the method 1300 ends at 1308. Turning back to 1304, if the received MIKEY message is an extended responder MIKEY message, execution then transitions to 1310, where the responder instead parses the extended responder MIKEY, and again the method 1300 ends at 1308.

Referring to FIG. 14, a method 1400 for parsing an extended responder MIKEY message in accordance with the present teachings is shown. Method 1400 starts at 1402, where the initiator parses the standard responder MIKEY message fields, such as HDR and RAND. At 1404, the initiator parses the general extension payload. Method 1400 supports two embodiments, i.e., where the initiator detects a legacy KMM embedded in the general extension payload and a second embodiment where the initiator detects that the general extension payload conveys an extended KMM response.

In the first embodiment, based on the value in the general extension payload's type subfield 1204, the initiator determines that the general extension payload embeds the legacy KMM response. At 1406, the initiator views the data subfield 1208 (FIG. 12) of the general extension payload as two sub-fields: a KMM type subfield 1224 (FIG. 12) and a KMM response subfield 1226 (FIG. 12). At 1408, the initiator uses the value in the KMM type 1224 to determine the protocol according to which the legacy KMM response contained in subfield 1226 (FIG. 12) is constructed. The initiator parses (1410) the KMM response subfield 1226 to extract the actual legacy KMM response.

Turning back to 1404 (FIG. 14), in the second embodiment, based on the value in the general extension payload's type subfield 1204, the initiator determines the general extension payload defines a response to a key-management operation that is not supported by the standard MIKEY protocol. At 1412, the initiator views the data subfield 1208 (FIG. 12) of the general extension payload as two subfields: a KMM type subfield 1210 (FIG. 12) and a KMM response subfield 1212 (FIG. 12). At 1414, the initiator uses the value in the KMM type subfield 1210 to determine the type of the KMM response contained in subfield 1212, such as response to key deletion or activation.

The initiator then parses (1416) the KMM response subfield 1212. For example, when the KMM type subfield 1210 indicates a response to key deletion, the initiator views the KMM response subfield 1212 as three or more subfields: a number of statuses subfield 1214 (FIG. 12), one or more key identification subfields 1216, and one or more status subfields 1218. The number of statuses subfield 1214 specifies the number of the key identification subfield 1216 and status subfield 1218 pairs. The key identification 1216 describes a key that was requested to be deleted. The initiator views the key identification subfield 1216 two subfields: a key ID type subfield 1220 and key ID data subfield 1222. The key ID type subfield 1220 is substantially the same as the key ID type subfield 434 (FIG. 4), and the key ID data subfield 1222 is substantially the same as the key ID data subfield 436 (FIG. 4). In one illustrative implementation, the status subfield 1218 describes the status of the deletion operation on the key described by the corresponding key identification subfield 1216. For example, a value of 0x00 in the status subfield 1218 signals a successful key deletion, while a value of 0x01 signals that the key to be deleted was not found.

Persons of skill in the art will understand that this disclosure may be extended to other embodiments than those specifically disclosed herein. In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article or apparatus that comprises, has, includes, contains a list of elements does not include only those elements but may include other elements not expressly listed or inherent to such process, method, article, or apparatus. An element proceeded by "comprises . . . a", "has . . . a", "include . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. A device or structure that is "configured" in a certain way is configured in at least that way, but may also be configured in ways that are not listed. Also, the sequence of steps in a flow diagram or elements in the claims, even when preceded by a letter does not imply or require that sequence.

Moreover, an embodiment can be implemented as a computer-readable storage medium having computer readable code stored thereon for programming a computer (e.g., comprising a processor) to perform a method as described and claimed herein. Examples of such computer-readable storage medium include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of modifying Multimedia Internet KEYing (MIKEY) protocol to support extended key-management messages (KMMs), the method comprising:
    a first device performing:
    constructing a KMM, the KMM directed to a second device;
    determining that the KMM is an extended KMM related to a key-management operation that is not supported by the MIKEY protocol;
    signaling the extended KMM in at least one field of a MIKEY message, wherein the field of the MIKEY message is used as a signal that the KMM is an extended KMM; and
    sending the MIKEY message to the second device;
    wherein the extended KMM comprises a key-management protocol message constructed using a key-management protocol separate from the MIKEY protocol; and
    wherein signaling the extended KMM in the at least one field of the MIKEY message comprises inserting the key-management protocol message into the at least one field of the MIKEY message.

2. A method of modifying a Multimedia Internet KEYing (MIKEY) protocol message to support extended key-management messages (KMMs), the method comprising:
    a first device performing:
    receiving a MIKEY message;
    detecting that the MIKEY message contains, in at least one field, signaling for an extended KMM related to a key-management operation that is not supported by the MIKEY protocol, wherein the field of the MIKEY message is used as a signal that the KMM is an extended KMM; and
    parsing the MIKEY message to extract the extended KMM from the at least one field of the MIKEY message;
    wherein detecting that the MIKEY message contains signaling for the extended KMM comprises:
    detecting a type of the extended KMM in a general extension payload field or a Key Data Transport Payload field of the MIKEY message;
    detecting that the type of the extended KMM comprises a key-management protocol message constructed using a key-management protocol separate from the MIKEY protocol.

* * * * *